(12) United States Patent
O'Connor et al.

(10) Patent No.: US 11,745,614 B2
(45) Date of Patent: Sep. 5, 2023

(54) PORTABLE HIGH-VOLTAGE VEHICLE CHARGING SYSTEM

(71) Applicant: FORD GLOBAL TECHNOLOGIES, LLC, Dearborn, MI (US)

(72) Inventors: Michael John O'Connor, Keego Harbor, MI (US); Timothy Harris, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 17/079,936

(22) Filed: Oct. 26, 2020

(65) Prior Publication Data

US 2022/0126724 A1 Apr. 28, 2022

(51) Int. Cl.
| | | |
|---|---|---|
| *B60L 53/00* | (2019.01) | |
| *B60L 53/57* | (2019.01) | |
| *B60L 53/66* | (2019.01) | |
| *B60L 58/22* | (2019.01) | |
| *B60L 53/53* | (2019.01) | |
| *B60L 53/16* | (2019.01) | |
| *H02J 7/00* | (2006.01) | |
| *H02J 7/34* | (2006.01) | |

(52) U.S. Cl.
CPC ............... *B60L 53/57* (2019.02); *B60L 53/16* (2019.02); *B60L 53/53* (2019.02); *B60L 53/66* (2019.02); *B60L 58/22* (2019.02); *H02J 7/0063* (2013.01); *H02J 7/342* (2020.01); *B60L 2210/10* (2013.01)

(58) Field of Classification Search
CPC .......... B60L 53/57; B60L 53/16; B60L 53/66; B60L 53/53; B60L 53/62; B60L 58/22; B60L 2210/10; H02J 7/0063; H02J 7/342; H02J 7/0047; H02J 2207/40; Y02T 90/12; Y02T 10/7072; Y04S 30/12
See application file for complete search history.

(56) References Cited

U.S. PATENT DOCUMENTS

| | | | | |
|---|---|---|---|---|
| 8,299,754 B2* | 10/2012 | Hayashigawa | ......... | B60L 53/16 |
| | | | | 320/109 |
| 8,502,502 B2* | 8/2013 | Huang | .................. | H01M 50/20 |
| | | | | 320/120 |
| 8,627,908 B2* | 1/2014 | Wellborn | ................ | B60L 15/42 |
| | | | | 701/96 |

(Continued)

FOREIGN PATENT DOCUMENTS

| | | | | |
|---|---|---|---|---|
| CN | 207790377 U | * | 8/2018 | |
| EP | 3738817 A1 | * | 11/2020 | .............. B60L 53/20 |

(Continued)

*Primary Examiner* — Naum Levin
(74) *Attorney, Agent, or Firm* — David B Kelley; Brooks Kushman P.C.

(57) ABSTRACT

A high-voltage portable charging system for remote recharging of an electric vehicle includes a housing, an array of battery cells forming a high-voltage battery disposed in the housing, and a low-voltage battery disposed in the housing. A coupler assembly has a cord and a vehicle connector configured to connect to a vehicle charge port. A switching arrangement is powered by the low-voltage battery and is configured to electrically connect the high-voltage battery to the cord when in a first condition and to de-energize the cord when in a second condition.

14 Claims, 5 Drawing Sheets

(56) References Cited

U.S. PATENT DOCUMENTS

| | | | | |
|---|---|---|---|---|
| 8,963,481 | B2* | 2/2015 | Prosser | B60L 53/00 |
| | | | | 320/105 |
| 9,266,438 | B2 | 2/2016 | Power et al. | |
| 9,290,104 | B2* | 3/2016 | Gadh | B60L 53/66 |
| 9,397,513 | B2* | 7/2016 | Butler | B60L 53/80 |
| 9,511,676 | B2* | 12/2016 | Loftus | B60L 53/16 |
| 9,592,742 | B1* | 3/2017 | Sosinov | B60L 53/38 |
| 9,815,375 | B2* | 11/2017 | Matsuda | B60L 58/10 |
| 9,887,570 | B2* | 2/2018 | Johnsen | B60L 53/14 |
| 10,046,661 | B2* | 8/2018 | DeDona | B60L 58/21 |
| 10,207,592 | B1* | 2/2019 | Warden | G05D 1/021 |
| 10,243,394 | B2* | 3/2019 | Steinbuchel, IV | B60L 53/18 |
| 10,333,338 | B2* | 6/2019 | Zenner | B60L 15/2009 |
| 10,611,247 | B1* | 4/2020 | Breen | H02J 7/1423 |
| 10,759,287 | B2* | 9/2020 | Vahedi | H02J 7/045 |
| 10,926,644 | B1* | 2/2021 | Willson | B60L 53/11 |
| 10,946,762 | B2* | 3/2021 | Gupta | G06Q 30/0283 |
| 11,283,273 | B2* | 3/2022 | Smith | H02M 7/44 |
| 2013/0020993 | A1* | 1/2013 | Taddeo | B60L 53/65 |
| | | | | 320/109 |
| 2013/0134938 | A1* | 5/2013 | Bianco | B60L 53/18 |
| | | | | 320/109 |
| 2014/0097797 | A1* | 4/2014 | Hendrix | H01M 10/425 |
| | | | | 320/118 |
| 2018/0264955 | A1* | 9/2018 | Gupta | B60L 53/20 |
| 2019/0351783 | A1* | 11/2019 | Goei | B60L 53/665 |
| 2020/0331355 | A1* | 10/2020 | Choi | B60L 53/22 |
| 2020/0361329 | A1* | 11/2020 | Schütz | B60L 53/302 |
| 2021/0031638 | A1* | 2/2021 | Lehmeier | B60L 53/63 |
| 2022/0111747 | A1* | 4/2022 | Goei | B60L 53/66 |
| 2022/0371462 | A1* | 11/2022 | Isaksson | B60L 53/57 |

FOREIGN PATENT DOCUMENTS

| | | |
|---|---|---|
| FI | 12905 Y1 * | 2/2021 |
| WO | 2014143006 A1 | 9/2014 |

\* cited by examiner

PORTABLE HIGH-VOLTAGE VEHICLE CHARGING SYSTEM

TECHNICAL FIELD

This disclosure relates to remote recharging of electric vehicles and more particularly to a high-voltage portable charging system for remote recharging.

BACKGROUND

An electric vehicle includes at least an electric machine for propulsion. The torque (or power) produced by the electric machine can be transferred through a gearbox to the driven wheels to propel the vehicle. A traction battery supplies energy to the electric machine. The range of the vehicle is limited by the amount of energy stored in the traction battery. Like their conventional counterparts, electric vehicles may run out of energy during a trip, which in a conventional vehicle is commonly referred to as running out of gas. Unlike gasoline, which is easily portable, an electric vehicle is typically charged at a permanent structure such as a charging station, a private residence, or the like.

SUMMARY

According to one embodiment, a high-voltage portable charging system for remote recharging of an electric vehicle includes a housing, an array of battery cells forming a high-voltage battery disposed in the housing, and a low-voltage battery disposed in the housing. A coupler assembly has a cord and a vehicle connector configured to connect to a vehicle charge port. A switching arrangement is powered by the low-voltage battery and is configured to electrically connect the high-voltage battery to the cord when in a first condition and to de-energize the cord when in a second condition.

According to another embodiment, a high-voltage portable charging system for remote recharging of an electric vehicle includes a housing, a high-voltage battery having a plurality of battery cells, a coupler assembly having a cord and a vehicle connector configured to connect with a vehicle charge port, and a switching arrangement configured to electrically connect the high-voltage battery to the cord when in a first condition and to de-energize the cord when in a second condition. A controller is programmed to, send and receive charging parameters with a vehicle to be charged; receive, from the vehicle, a request to begin charging; and, in response to receiving the request to begin charging, command the switching arrangement to the first condition.

According to yet another embodiment, a high-voltage portable charging system for remote recharging of an electric vehicle includes a housing, a high-voltage battery having a plurality of battery cells, a coupler assembly having a cord and a vehicle connector configured to connect with a vehicle charge port. A DC/DC converter is electrically connected between the cord and the high-voltage battery. The DC/DC converter is configured to modify a received voltage from the high-voltage battery and output the modified voltage to the cord. A switching arrangement is configured to electrically connect the high-voltage battery from the DC/DC converter when in a first condition and to electrically isolate the high-voltage battery in a second condition. A low-voltage battery is connected to the DC/DC converter. The DC/DC converter is configured to stepdown voltage received from the high-voltage battery to a voltage compatible with the low-voltage battery so that the low-voltage battery may be charge with the high-voltage battery. A high-voltage charge port is connected to the high-voltage battery through the switching arrangement. A controller is programmed to, in response to the vehicle connector being inserted in a vehicle, (i) send and receive charging parameters with the vehicle to be charged, (ii) receive, from the vehicle, a request to begin charging, and (iii), command the switching arrangement to the first condition in response to receiving the request to begin charging; and, in response to an external charger being connected to the high-voltage charge port, (i) send, to the external charger, a request to begin charging and (ii) command the switching arrangement to the first condition to charge the high-voltage battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles are moving away from internal-combustion engines and towards electrification to reduce pollution. An electric vehicle includes one or more motors that power driven wheels. The motors may be powered by a traction battery. The traction battery or battery pack stores energy that can be used by the electric motors. The traction battery typically provides a high-voltage (HV) direct current (DC) output from one or more battery cell arrays, sometimes referred to as battery cell stacks, within the traction battery. Used herein, "high voltage" refers to greater than or equal to 50 volts DC and 60 volts AC. The battery cell arrays may include one or more battery cells. The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Like their gasoline counterparts, electric vehicles have a finite range and must be recharged periodically to prevent over draining the battery. The vehicle 12 may be recharged by a charging station, such as electric vehicle supply equipment (EVSE), connected to an external power source. The external power source may be an electrical power distribution network or grid as provided by an electric utility company. The EVSE may receive and transfer the received electrical power through a cord and connector that plugs into a mating charge port on the electric vehicle. As one example, the external power may be AC power received at the charge port that is converted to DC power by an on-board charger located within the electric vehicle. The on-board charger may then operate to charge the traction battery. Alternatively, the on-board charger may be located in the EVSE external to the electric vehicle.

Like gasoline-powered vehicles, it is possible for an electric vehicle to run out of energy in the middle of a trip, thus becoming stranded. Therefore, a need exists for a portable charging system that is capable of providing sufficient charge to the vehicle traction battery so that a stranded motorist can drive to the nearest available charging system, e.g., their home or a commercial charging station. The portable charging system may include a high-voltage battery, a connector configured to couple with the vehicle charge port, and circuitry configured to transfer power from the high-voltage battery of the portable charging system to the traction battery of the vehicle to recharge the traction battery. The portable charging system may be direct current (DC) and/or alternating current (AC).

In some embodiments, the portable charging system may be quite heavy, e.g., hundreds of pounds, and may be mounted to a vehicle, such as a road-side assistance vehicle. For example, the portable charging system may be secured in a bed of a truck or in the back of a commercial van. In other embodiments, the portable charging system may be lighter allowing a person to move the portable charging system with a handcart, dolly or the like. Generally, the size and weight of the portable charging system dictates the energy-storage capacity. That is, heavier portable charging system typically store more kilowatt-hours (kWh) of energy than lighter ones. This may allow the larger charging system to more fully charge the traction battery and/or to service more than one electric vehicle on a single charger of the portable charging system.

Figure 1:
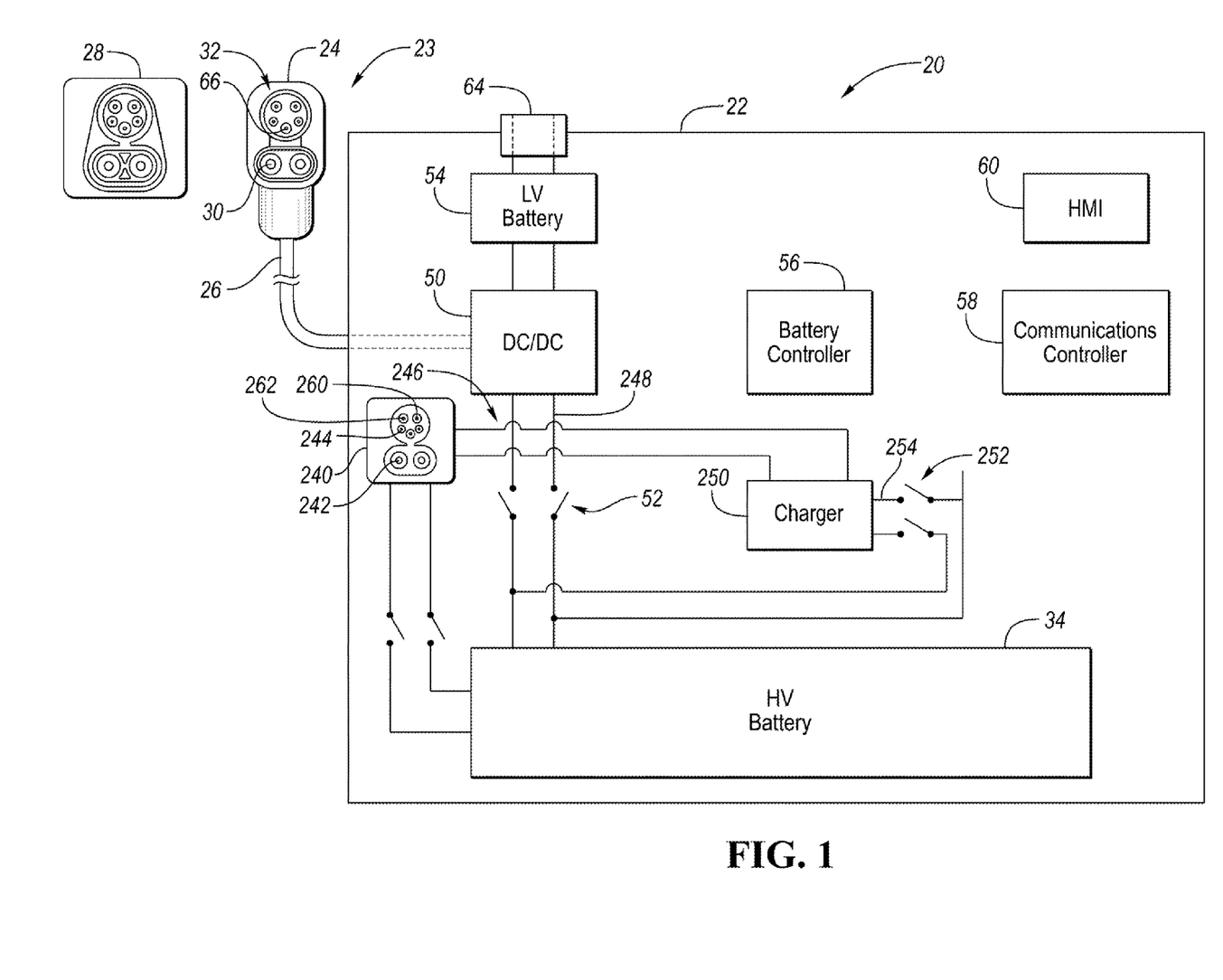
FIG. 1 is a diagrammatical view of a high-voltage portable charging system.

Referring to FIG. 1, a portable DC charging system 20 may include a housing 22 that contains the various electrical equipment. External to the housing 22 is a coupler assembly 23 including a connector 24 attached to the housing 22 by a cable 26. The connector 24 is configured to be received within a vehicle charge port 28. The vehicle charge port 28 is shown as an SAE J1772 Type 1 CCS AC and fast DC combo. Of course, other types of vehicle charge ports are available and may vary by vehicle manufacturer, model year, country of origin, and other standards. The connector 24 is shown as a DC connector and includes a pair of DC lines 30 and the signal lines 32. The signal lines 32 may be a control pilot, a proximity pilot, and ground according to SAE J1772.

Figure 2:
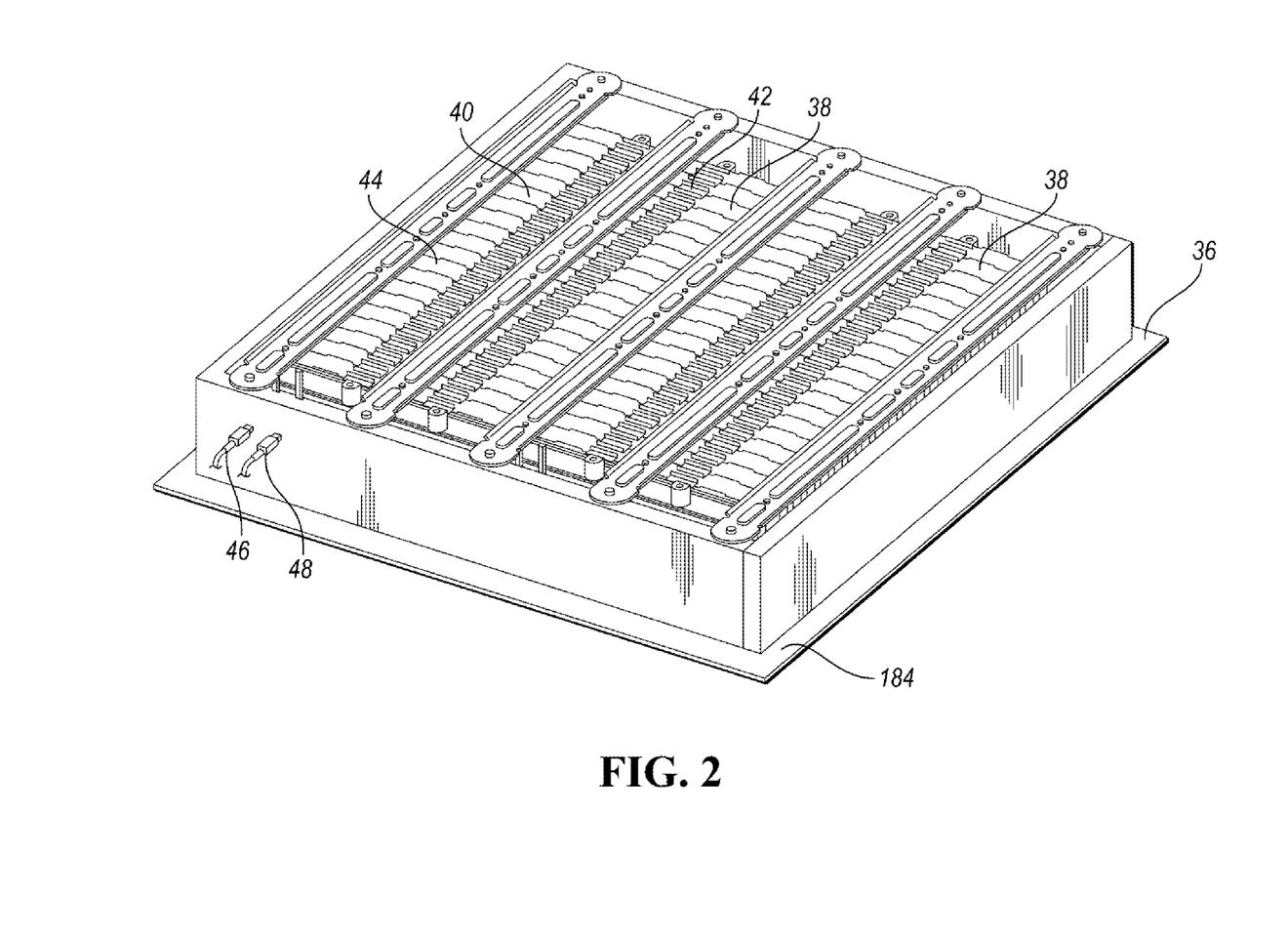
FIG. 2 is a perspective view of a high-voltage battery of the portable charging system according to one or more embodiments of this disclosure.

Referring to FIGS. 1 and 2, a high-voltage battery 34 is disposed in the housing 22. The battery 34 may be a lithium-ion battery or other chemistry. The battery 34 may include a tray 36 that supports at least one battery array 38. For example, the tray 36 may support a pair of adjacent battery arrays 38. The at least one battery array 38 includes a plurality of stacked battery cells 40. Each cell 40 may include a housing, a positive electrode (cathode) and a negative electrode (anode). An electrolyte may allow ions to move between the anode and cathode during discharge, and then return during recharge. Terminals 42 may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. The cells 40 may be pouch cells, prismatic cells, cylindrical cell, or any other type. The cells 40 may be stacked in a linear arrangement to form the arrays. A plurality of cell spacers 44 may be interleaved with the cells 40. The battery 34 may include pair of positive and negative output terminals 46, 48 that connects with the power electronics of the charging system 20. The battery 34 may have an energy storage capacity of at least 5 kWh. The battery 34 may include a thermal management system for regulating a temperature of the battery. For example, the battery may include an air-cooling system having a fan and air ducts or may employ a liquid coolant system.

Referring back to FIG. 1, the power electronics of the charging system 20 may include a DC/DC converter 50 connectable to the battery 34 by one or more contactors 52. The DC/DC converter 50 is also electrically connected with a low-voltage battery 54. The low-voltage (LV) battery 54 may be 12 volts, 24 volts, 48 volts or the like. The LV battery 54 as part of a low-voltage system that powers the controllers of the charging system 20 including a battery controller 56 and a communications controller 58. The low-voltage system may also power a human-machine interface (HMI) 60. The HMI 60 may include a display, e.g., a touch screen, buttons, dials, switches, audio, a microphone, etc. the charging system 20 may also be configured to wirelessly communicate with a remote device, e.g., cell phone. For example, the charging system 20 may have an associated application that can be downloaded to a user's device, e.g., a cell phone.

The HMI 60 may include a display that shows parameters of the charging such as the amount of energy transferred from the charging system 20 to the vehicle, e.g., a kWh counter, voltage readings, current readings, charge status, state of charge (SOC) of the battery 34, and SOC of the vehicle traction battery. The display may also show a charging target, e.g., SOC of traction battery, kWh of energy transferred, a timer, and the like.

The controllers of the charging system 20, such as battery controller 56 and the communication controller 58, may be part of a larger control system and may be controlled by various other controllers throughout the vehicle charger. It should therefore be understood that the controllers 56 and 58 and one or more other controllers can collectively be referred to as a "controller" that controls various tasks related to charging of a vehicle and recharging of the HV battery 34. Controllers may include a microprocessor or central processing unit (CPU) in communication with various types of computer-readable storage devices or media.

Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controllers may communicate with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller(s) within each of the subsystems.

The battery controller 56 acts as a controller for the battery 34 and may also include an electronic monitoring system that may manage voltage, power, current, temperature and charge state of each of the battery cells. The battery 34 may have a temperature sensor such as a thermistor or other temperature sensor. The temperature sensor may be in communication with the battery controller 56 to provide temperature data. The controller 56 may include integrated voltage and/or current sensors. The controller 56 is also configured to perform battery maintenance such as cell balancing.

The communication controller 58 is program to communicate with a vehicle to facilitate charging of the vehicle traction battery. The controller 58 may communicate with the vehicle through the connector 24, e.g., power-line communication, or wirelessly through WiFi, BLUETOOTH, or the like. The communication controller 58 is capable of communicating security protocols and charging protocols with the vehicle, and to actively manage charging, perform closed-loop feedback controls, and fault detection. The charging system 20 may also include a power supply 64 that allows the battery 54 to be charged using an AC power source, such as a wall outlet, or a DC power source.

Figure 3:
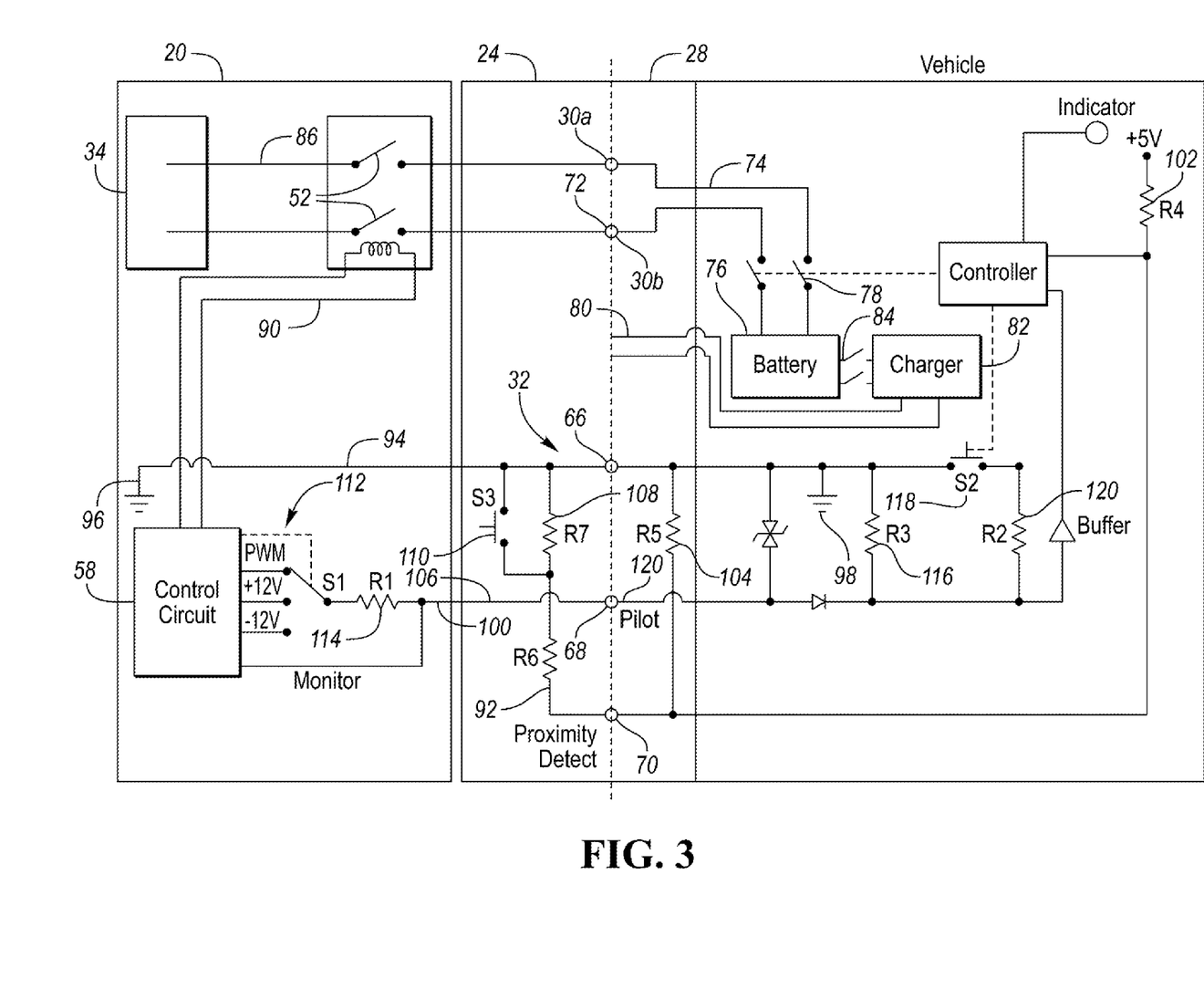
FIG. 3 is a diagram illustrating a connection interface between a vehicle and the portable charging system.

Referring to FIG. 3, in one or more embodiments, the charging system 20 may communicate with a vehicle through power-line communication using a signaling circuit according to SAE J1772. The connector 24 may include five pins, two high-voltage DC line pins 30a, 30b and three signal pins 32. The signal pins 32 include a ground pin 66, a pilot pin 68, and a proximity pin 70. The pins may be male or female pins. These five pins connect with five corresponding pins 72 on the vehicle.

The vehicle may have DC power lines 74 connected to the vehicle traction battery through contactors 78. The vehicle may also have AC power lines connected to the battery 76 through a charger 82 and contactors 84. The charger 82 may convert the AC voltage to a DC voltage required by the battery 76. The operation may be controlled by one or more vehicle controllers and by the controllers of the charging system 20. The vehicle contactors selectively couple output lines 86 of the charging system 20 to the terminals of the traction battery 76. The vehicle contactors may isolate the battery 76 from the charging system 20 when not charging the traction battery. When a connection to the charger output lines 86 is required, the contactors may be closed to connect the battery 34 to the charging system 20. The contactors may be opened and closed by a control signal driven by one or more vehicle controllers. The contactors may utilize a relay-type contactor or a solid-state device to achieve the function. The contactors may be opened when the charge connector 24 is not attached to the charge port 28.

The connector 24 connects to the vehicle charge port 28. The charging system 20 may provide one or more high-power lines 86 to the vehicle 12. The lines may be AC or DC. In the illustrated example, the lines 86 are DC and are connected to the DC pins of the vehicle charge port 28. The high-power lines 86 may provide a line for high-voltage and a return path to complete the circuit. The charging system 20 may be capable of connecting and disconnecting the battery 34 to the high-power lines 86 via the contactors 52. The contactors 52 may be opened and closed by a control signal 90 driven by the controller 58. The contactors 52 may utilize a relay-type contactor or a solid-state device to achieve the function. The control signal 90 may drive a relay coil to control a relay.

In addition to the high-power lines 86, the charging system 20 may interface with the vehicle via a number of signal lines to aid in controlling the charging process. The signal lines are low power signals that provide an interface between the control module 58 of the charging system 20 and the controller in the vehicle. The controller 58 may include a microprocessor system having the capability to process the input values and generate output signals as appropriate. The controllers may include appropriate analog-to-digital conversion circuitry to measure the voltage level of the signals.

The signals may be monitored to determine whether the connector 24 is connected to the charge port 28. Detecting a connection is important as it may provide an indication that charging is possible and also to prevent a driver from driving off while the connector 24 is attached to the vehicle. A proximity signal 92 may be defined that is indicative of a state of engagement between the charge port 28 and the connector 24. The voltage of the proximity input 92 measured by the controller 58 may vary based on the configuration of various resistances in the circuit.

In addition to the signal connections, a ground connection 94 may be provided by the connector 24. The ground connection 94 may provide a path to the ground connection 96 of the charging system 20. The corresponding vehicle charge port 28 connection may be connected to a ground connection 98 of the vehicle. When the connector 24 is plugged into the charge port 28, the charger ground 96 and the vehicle ground 98 may be at a common level. The common ground 96 allows both controllers to determine the same level of the voltages on the signal lines (92, 100).

The voltage of the proximity detect input 92 at the vehicle controller input varies as a function of the voltage divider network created by the resistance values in the connector 24 and the vehicle charge port 28. In an unconnected condition, the proximity signal 92 may have a voltage that is the result of voltage divider circuit comprised of resistances R4 102 and R5 104 relative to the vehicle ground 98. The approximate voltage that would be measured at the vehicle controller may be $5V*(R5/(R5+R4))$. A voltage at this level may be indicative of disengagement between the charge port 28 and the charging system 20.

When the connector 24 is installed in the charge port 28 and the pins have made contact, resistances R6 106 and R7

108 may be in parallel with resistance R5 104. This alters the voltage divider network and changes the voltage measured at the proximity detect input 92. The connector 24 may have a button or latch that operates a switch S3 110. The button or latch may change the state of switch S3 110 when inserting or removing the connector 24. If the switch S3 110 is open, the series combination of R6 106 and R7 108 will be in parallel with R5 104. If switch S3 110 is closed, R6 106 will be in parallel with R5 104. In each case, the voltage measured by the controller 58 will change levels. By measuring the voltage of the proximity detect pin 70, the controller 58 can determine if the connector 24 is attached and the status of the switch S3 110.

Upon physical connection of the connector 24 to the vehicle charge port 28, the proximity circuit detects a voltage drop, e.g., from 12 V to 9 V, indicating that charging system 20 is connected to the vehicle. This activates an oscillator (waveform generator) 112 of the control pilot circuit 100. The control pilot circuit 100 is used to control the charging process between the charging system 20 and the vehicle. The control pilot circuit includes an oscillator 112 configured to generate a plus-minus 12-volt pulse width modulation (PWM) signal at 1 kilohertz (kHz) duty cycle for example. During operation, the duty cycle may vary. This PWM signal is communicated to the vehicle over the cord/port and is detected by the vehicle controller.

The vehicle and the charging system 20 are expected to monitor the pilot signal 100 and respond according to the status of the signal. The controller 58 may connect the pilot signal 100 to output values of +12V, −12V, or a PWM output depending on the charging status. When the connector 24 is engaged with the charge port 28, the controller 58 may connect the pilot signal 68 pin to +12V. When the connector 24 is disengaged from the charge port 28, the vehicle may open S2 and the controller 56 may open the contactors 52, among other tasks.

Once the connector 24 is engaged with the vehicle charge port 28, the +12V originating from the controller 58 may be provided to the vehicle pilot signal circuitry. When the connector 24 is engaged and connected to the charge port 28, the pilot signal 100 voltage at the connector may be defined by the voltage divider formed by resistances R1 114 and R3 116 relative to ground 96. The resulting voltage may indicate to the vehicle controller and the controller 58 that the connecter 24 is connected to the charge port 28 and represents a valid pilot signal 100. Under normal conditions, the proximity detect signal 92 may indicate the same engagement status.

In response to a connection being established, the vehicle controller may close a switch S2 118 which places resistance R2 120 in parallel with resistance R3 116. The switch S2 118 may normally be open. The switch S2 118 may be controlled by the vehicle controller via a control signal. The vehicle controller should close switch S2 118 if it determines that the vehicle is ready to accept energy from the charging system 20. Closing the switch S2 118 alters the voltage divider that was formed by R1 114 and R3 116 by placing resistance R2 120 in parallel with resistance R3 116 and the voltage level of the pilot signal 100 may be changed. The controller 58 may monitor the control pilot 100 voltage level to determine the current status of the pilot signal 100 based on the voltage measurement.

Once it is determined that the vehicle is ready to accept energy from the charging system 20, the controller 58 may provide a PWM signal with a defined frequency to the pilot line 100. The duty cycle of the PWM signal may be proportional to the amount of current that the charging system 20 is capable of providing. The pilot signal 100 may be considered valid when the frequency and duty cycle of the PWM signal are within predefined limits. Once the vehicle is ready to accept energy from the charging system 20, the contactors 52 for providing power to the vehicle may be closed.

SAE J1772 is but one example standard for power-line communication and pin configuration. Other standards are available, and these may be used with the charging system 20. The charging system 20 may also include unique circuitry for communicating with the vehicle and managing charging.

Figure 4:
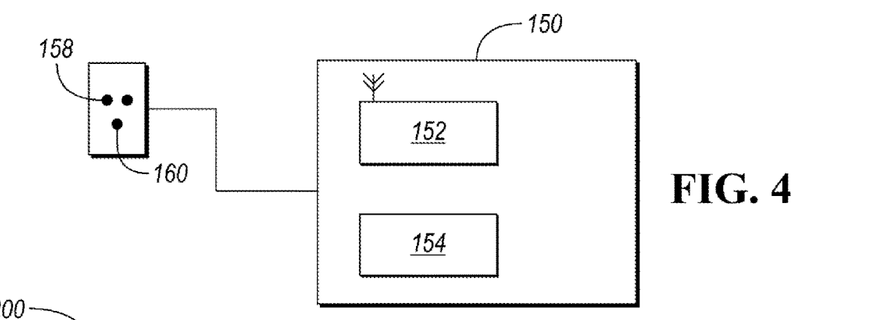
FIG. 4 is a diagrammatical view of a wireless communication module and a coupler assembly of a high-voltage portable charging system according to another embodiment of this disclosure.

Referring to FIG. 4, in one or more alternative embodiments, the charging system may also communicate with the vehicle using wireless communication such a BLUETOOTH and/or WiFi. For example, a high-voltage portable charging system 150 may include a wireless transceiver 152 (e.g., a BLUETOOTH module, a ZIGBEE transceiver, a Wi-Fi transceiver, an IrDA transceiver, an RFID transceiver, etc.) configured to communicate with a compatible wireless transceiver of the vehicle to be charged. The wireless transceiver is electrically connected to a communications controller 154 of the charging system 150. The communication controller 154 is configured to send and receive data with the vehicle via the transceiver 152. When wireless communicate is used, instead of power-line communication, the vehicle connector 156 does not require signal pins. (Although, in some embodiments, the charging system may communicate over both power-line communication and wireless communication.) As such, the connector 156 may only include two high-voltage pins 158 and a ground pin 160.

Control logic or functions performed by controller(s) of the charging system 20 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
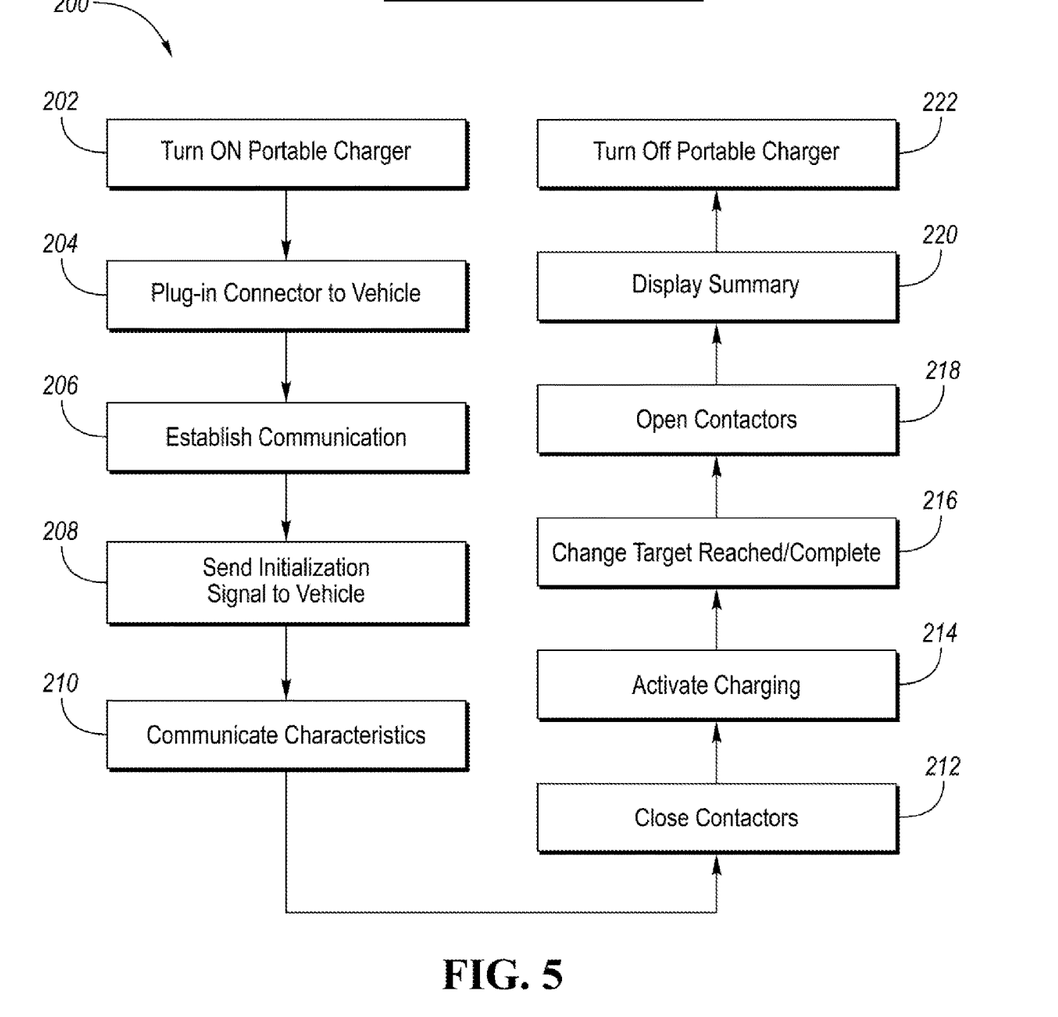
FIG. 5 is a flowchart of an algorithm for charging a vehicle with the high-voltage portable charging system.

FIG. 5 illustrates a flowchart 200 of controls for charging a vehicle with a high-voltage portable charging system. The controls may be in compliance with ISO standard 15118. At operation 202, the portable charging system is turned ON. At operation 202, the connector of the portable charging system is plugged into the vehicle charge port. Communication is established between the one or more controllers of the portable charging system and the one or more controllers of the vehicle at operation 206. At operation 208, an initialization signal is sent to the vehicle to wake up the vehicle controller. In one or more power-line communication embodiments, the initialization signal is sent over the pilot circuit. In one or more wireless communication embodiments, the initialization signal is sent over via a wireless transceiver. At operation 210, the controller of the portable charging system sends and receives data to and from the vehicle controller to communicate charging characteristics. The data may include security protocols, charging parameters, closed-loop controls, and fault detection. The charging parameters may include battery voltage, peak power limits of the charger and the vehicle, battery capacities for the high-voltage battery of the charging system and the traction battery, etc. The communications of operation 210 also include data related to initiating charging. For example, the controller of the portable charging system may receive a request (charging ready signal) to begin charging from the vehicle. In response to request to begin charging, the portable charging system closes its contactors to electrically connect the high-voltage battery to the DC/DC converter and the connector at operation 212. While not required, in some embodiments, and particularly if a DC/DC is not included, the charging system may include an initialization sequence for closing the contactors. For example, the charging system may include a pre-charged circuit having a pre-charge contactor that is closed to energize the bus prior to closing the main contactors.

Once the contactors of the charging system are closed, power begins to flow from the high-voltage battery of the charging system to the traction battery of the vehicle. At operation 214, the one or more controllers of the portable charging system modulate the flow of power based on charging parameters. For example, the controller of the charging system may control the DC/DC converter to regulate the voltage provided to the high-voltage pins of the charging system. The DC/DC converter may boost the voltage provided by the high-voltage battery to deliver power at a higher voltage that is more compatible with the vehicle.

The charging of the traction battery by the portable charging system is typically not a complete charge and instead is a partial charge designed to provide the vehicle with sufficient energy to make it home or to the nearest available charging station. The amount of energy required for this will vary depending upon the characteristics of the vehicle and the distance of the stranded vehicle to the nearest available charging source. The charging of the vehicle with the portable charging system may last for a specific duration of time, until the traction battery reaches a certain SOC or voltage, for a predetermined amount of energy (kWh), etc. One or more of these parameters may be used as a target for ending charging. For example, charging may end in response to a timer expiring, the traction battery reaching a target SOC, the traction battery reaching a target voltage, an energy counter reaching a target energy (e.g., a kWh counter reaching a threshold), or an SOC of the charging system being less than or equal to a threshold. At operation 216, the target is tracked and charging ends in response to the charge target being reached.

Once the charge target is reached, the charging system begins a shutdown sequence including opening the contactors to electrically disconnect the high-voltage battery of the charging system from the pins of the connector at operation 218. Once charging concludes, the display may show a summary of the charging. For example, the displays may show the amount of energy transferred, the average voltage of the charge, the peak voltage of the charge, the duration of the charge, and the current SOC of the high-voltage battery of the charging system. This information may be useful for a roadside assistance company to determine monetary compensation for the charging event. At operation 222, the portable charging system is turned OFF and the connector is removed from the vehicle.

Referring back to FIG. 1, the charging system 20 may have a high-voltage charge port 240 to enable faster charging of the high-voltage battery 34. The high-voltage charge port 240 may be DC compatible, AC compatible, or combination of both. In the illustrated embodiment, the charge port 240 includes DC pins 242 and AC pins 244. This allows the charging system 20 to be compatible with both DC charging stations and AC charging stations. The DC pins are part of a DC circuit 246 that connect the DC pins 242 to the high-voltage bus 248 upstream of the contactors 52. Since the DC charging is compatible with the DC battery 34, the pins 242 can be directly connected to the high-voltage bus 248 without the need of an inverter or other device. In contrast, the AC pins 244 require an associated charger 250 that converts the AC power of the charging station to DC power compatible with the battery. The charge port 240 may be according to one or more standards such as SAE J1772 Type 1 CCS AC and fast DC combo.

The charging operation may be controlled by one or more controllers, such as the battery controller 56. The contactors 252 selectively couple output lines 254 of the charger 250 to the terminals of the battery 34. The contactors 252 may isolate the battery 34 from the charger 250 when not charging the battery 34. When a connection to the charger output lines 254 is required, the contactors may be closed to connect the battery 34 to the charger 250. The contactors may be opened and closed by a control signal driven by one or more controllers, such as controller 56. The contactors may utilize a relay-type contactor or a solid-state device to achieve the function. The contactors may be opened when a charge connector is not attached to the charge port 240.

The charging system 20 may communicate with the charging station wirelessly or through power-line communication. For example, the charging system 20 may communicate with the charging station according to SAE J1772. Here, the charge port 240 may include a ground pin 256, a proximity pin 258, and a pilot control pin 260. In some embodiments, the proximity pin, and associated circuit, may be omitted. The communication controller 58 of the charging system 20 may include another pilot-control circuit for the charge port 240. This circuit may be similar to the pilot-control circuit described above.

Figure 6:
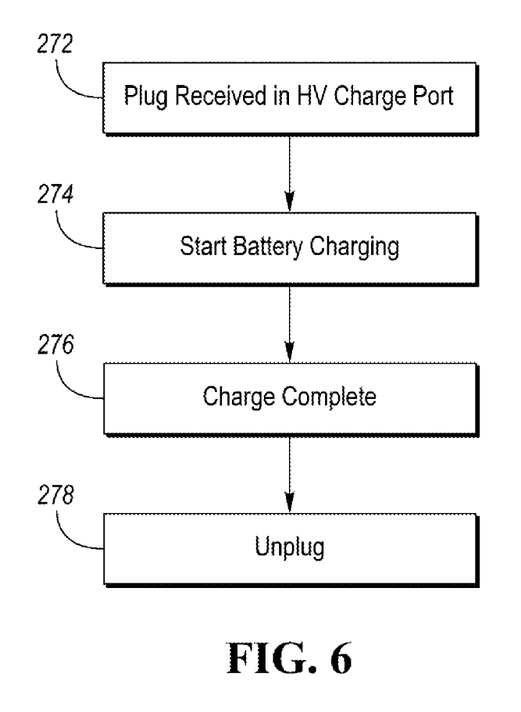
FIG. 6 is a flow chart of an algorithm for recharging the high-voltage portable charging system.

FIG. 6 illustrates a flow chart 270 of example controls for recharging the portable charging system 20. In operation 272, the charging plug is received within the high-voltage charging port of the portable charging system. Once communication and charging parameters are established, battery charging and started at operation 274. The battery cells may be balanced using a balance circuit during battery charging. Various parameters of the battery may be monitored during charging to determine when charging is complete as described above. Once these parameters indicate a complete charge, charging ends at operation 276. The charging cable may then be removed at operation 278. A similar process may be used to charge the battery using the low-voltage AC power supply 64.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A high-voltage portable charging system for remote recharging of an electric vehicle, comprising:
    a housing;
    an array of battery cells forming a high-voltage battery disposed in the housing;
    a coupler assembly including a cord and a vehicle connector configured to connect to a vehicle charge port;
    a low-voltage battery disposed in the housing;
    a low-voltage power supply electrically connected to the low-voltage battery;
    a switching arrangement, including at least one contactor, powered by the low voltage battery and configured to electrically connect the high-voltage battery to the cord when in a first condition and to de-energize the cord when in a second condition;
    a charger;
    a second switching arrangement configured to electrically connect the high-voltage battery to the charger when in a first condition and to electrically disconnect the high-voltage battery from the charger in a second condition;
    a battery controller;
    a charge port configured to receive external power for charging the array of battery cells, the charge port including:
        a pair of AC pins electrically connected to the charger via second contactors, a ground pin, and at least one signal pin electrically connected to the battery controller, and
        a pair of DC directly electrically connected to the array of battery cells via third contactors;
    a wireless transceiver; and
    a communications controller configured to wirelessly send and receive data with a vehicle via the wireless transceiver, the communication controller being programmed to:
        receive, from a vehicle, parameters of a traction battery of the vehicle,
        send, to the vehicle, parameters of the high-voltage battery, and
        receive, from the vehicle, a request to begin charging.

2. The high-voltage portable charging system of claim 1 further comprising a DC/DC converter configured to increase or decrease voltage of the high-voltage battery.

3. The high-voltage portable charging system of claim 2, wherein the switching arrangement is further configured to electrically connect the high-voltage battery to the DC/DC converter when in the first condition and to isolate the battery when in the second condition.

4. The high-voltage portable charging system of claim 1, wherein the communications controller includes a pilot-control circuit configured to detect a connection to a vehicle based on voltage readings.

5. The high-voltage portable charging system of claim 4, wherein the connector includes a pair of high-voltage power pins and a pilot pin that is part of the pilot-control circuit.

6. The high-voltage portable charging system of claim 5, wherein the connector further includes a ground pin and a proximity pin.

7. The high-voltage portable charging system of claim 1 further comprising a battery controller configured to monitor voltage of the battery and perform balancing of the battery cells.

8. The high-voltage portable charging system of claim 1, wherein the battery is a lithium-ion battery.

9. The high-voltage portable charging system of claim 1, wherein the communications controller is powered by the low-voltage battery.

10. The high-voltage portable charging system of claim 1 further comprising:
    a charge port including a pair of high-voltage DC pins, a ground pin, and at least one signal pin, wherein the DC pins are electrically connected to the battery when the switching arrangement is in the first condition and are electrically disconnected from the battery when the switching unit is in the second condition.

11. The high-voltage portable charging system of claim 1 further comprising:
    a display configured to show an amount of energy transfer from the high-voltage battery to a vehicle.

12. A high-voltage portable charging system for remote recharging of an electric vehicle, the comprising:
    a housing;
    a high-voltage battery including a plurality of battery cells;
    a coupler assembly including a cord and a vehicle connector configured to connect with a vehicle charge port;
    a low-voltage battery disposed in the housing;
    a low-voltage power supply electrically connected to the low-voltage battery;
    a first switching arrangement powered by the low voltage battery and configured to electrically connect the high-voltage battery to the cord when in a first condition and to de-energize the cord when in a second condition;
    a charger;
    a second switching arrangement configured to electrically connect the high-voltage battery to the charger when in a first condition and to electrically disconnect the high-voltage battery from the charger in a second condition;
    a charge port configured to receive external power for charging the array of battery cells, the charge port including:
        a pair of AC pins electrically connected to the charger via second contactors, a ground pin, and at least one signal pin electrically connected to the battery controller, and a pair of DC directly electrically connected to the array of battery cells via third contactors; and a controller programmed to:
send and receive charging parameters with a vehicle to be charged,
receive, from the vehicle, a request to begin charging, and
in response to receiving the request to begin charging, command the first switching arrangement to the first condition.

13. The high-voltage portable charging system of claim 12, wherein the controller is further programmed to command the first switching arrangement to the second condition in response to a charging target being reached.

14. The high-voltage portable charging system of claim 12 further comprising a DC/DC converter configured to increase or decrease voltage of the high-voltage battery.

* * * * *